May 9, 1944.  J. A. KRATZ  2,348,259
ELECTRIC CONTROL CIRCUIT
Filed May 14, 1942
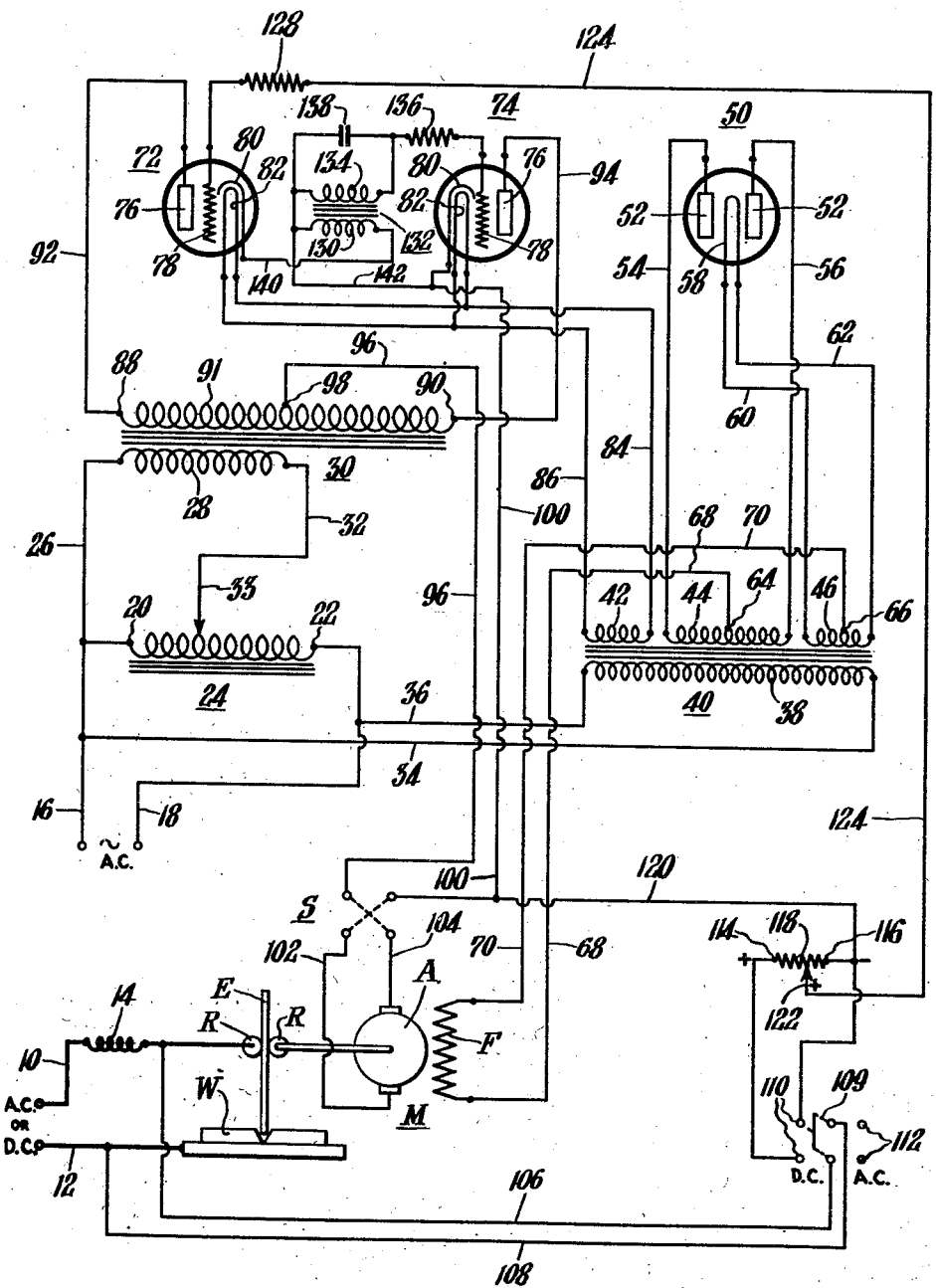
INVENTOR
JOHN A. KRATZ
BY
ATTORNEY Patented May 9, 1944

2,348,259

UNITED STATES PATENT OFFICE 2,348,259

ELECTRIC CONTROL CIRCUITS

John A. Kratz, Yonkers, N. Y., assignor to The Linde Air Products Company, a corporation of Ohio Application May 14, 1942, Serial No. 442,892

10 Claims. (Cl. 314—64)

This invention relates to electric control circuits, and more particularly to a control circuit embodying two or more control devices in which a control voltage is applied to one device and this device applies the control voltage to the other device or devices.

In many control installations, space discharge devices, usually of the "thyratron" type, are used to control the energization of an electrically operated element in response to certain predetermined electrical characteristics. Frequently, two or more of these grid-controlled space discharge devices are used in order that full wave rectified current may be supplied to the electrical element. Due to differences in the characteristics of the space discharge devices or differences in ambient temperatures, when two or more of the devices are controlled by the same voltage, they very often do not become conductive at substantially the same value of control grid voltage, resulting in a fluctuating output voltage. In some control applications, it is essential that the devices respond substantially uniformly to very minute changes in the control voltage.

Such control circuits have been adapted for use in automatic electric welding, wherein the spacing between the end of the welding rod and the work has been maintained substantially uniform by controlling the operation of an electrode feeding means or mechanism in accordance with electrical conditions existing in the welding zone. Generally, the welding voltage, or a suitable fraction thereof, is impressed upon the grids of a pair of space discharge devices which are used to supply full wave rectified current to the electrode feeding mechanism. The characteristics of the discharge devices are so selected that, when the welding voltage exceeds a predetermined value, which it does when the spacing between the end of the electrode and the work has increased beyond a predetermined amount, the voltage applied to the grids will exceed a critical value and the space discharge devices become effective to permit current to pass to the feeding mechanism. The latter thereby operates to advance the electrode toward the work until the predetermined electrode-work spacing is reattained. At such time, the grid voltage drops below the critical value and the feeding mechanism is no longer supplied with current.

Precision of control is desirable in such welding operations in order to produce strong welds of uniform quality, to control the amount and character of the fusion of the weld metal and the work, and to heat the work evenly along the line of weld. If the control devices do not become conductive at substantially the same value of control grid voltage, the precision of control is adversely affected. Specifically, if one device becomes conductive at a grid voltage of 30 volts and the other at a grid voltage of 40 volts, for instance, and the control voltage impressed on the grids is 35 volts, only one device will be operative to pass current. Hence, only half wave rectified current will be available for the electrode feeding mechanism or other controlled device.

It is therefore among the objects of this invention to provide a control system including two or more control devices in which a control voltage is impressed on one device and the other devices are controlled by the first device; to provide an improved electric welding circuit including a pair of grid controlled space discharge devices effective to energize an electrode feeding motor in which a suitable proportion of the welding voltage is impressed on the grid of one of the devices and a control voltage is impressed on the grid of the other device through the output circuit of the first device; to provide an improved control system embodying two or more space discharge devices and including means whereby such devices will all become effective to supply current whenever the control voltage exceeds a predetermined amount; to provide an improved welding control circuit embodying a pair of grid controlled space discharge devices in which the respective devices will become conductive not more than ½ cycle before or after each other; and to provide an improved, effective, and sensitive control system particularly adapted for controlling automatic electric welding operations.

These and other objects of the invention will in part be obvious and in part become apparent from the following description and the accompanying drawing, in which the single figure diagrammatically illustrates an electric welding system embodying the principles of the invention.

In its broadest aspects, the invention relates to an electrical control system embodying a plurality of control devices, the energization of one of which devices is controlled in response to an electrical characteristic of the controlled circuit, and this device in turn controls the energization of the other devices. More particularly, the invention relates to a motor energization control circuit embodying control devices, and in which the activation of one device is controlled in response to an electrical characteristic which is a function of the operation of the motor, and this device controls the activation of the other control devices. In a more limited aspect, the invention comprises an electrical control circuit including a pair of grid-controlled space discharge devices adapted to supply full wave rectified current to an electrical mechanism; and in which a control voltage is applied to one device, the output circuit of which controls the energization of the other device.

While as stated above, the invention is broadly applicable to electric control systems in general, and particularly to such systems for controlling the energization of an electric motor or other electrical device, it will, for purposes of illustration, be described more particularly as applied to an electric welding control system. However, it is to be understood that the invention is not limited to electric welding but is capable of application in any type of control system embodying a plurality of control devices.

Generally speaking, in accordance with the principles of the present invention, power for energizing an electrically operative device, such as the electrode feeding mechanism in an automatic electric welding system, is supplied through a plurality of grid-controlled space discharge devices of the type which permit a flow of current when the relative positive potential of the control grid with respect to the cathode exceeds a certain value, hereinafter called the critical value. When such relatively positive potential of the control grid is less than this critical value, the power supply to the feeding mechanism is interrupted.

Through a suitable control circuit, a voltage is impressed upon the grid or control circuit of one of the space discharge devices, which voltage is proportional to a characteristic of the welding circuit. In the usual case, such voltage may be directly proportional to the welding voltage or current, and is impressed across the grid and cathode of one of the space discharge devices. Means may be provided so that, if the voltage exceeds a predetermined value, the voltage impressed on the grid of the space discharge device will exceed the critical value. Hence, in a welding circuit, when the distance between the fusible end of the electrode and the work increases, thus increasing the welding voltage drop, the space discharge devices supply current to the feeding mechanism. The feeding mechanism thereby becomes operative to advance the electrode toward the work until the predetermined spacing is again obtained. When such spacing is effected, or when the electrical characteristic which is to be controlled has re-attained its predetermined value, the potential impressed on the grid of the one space discharge device is less than the critical value and the power supply for the feeding mechanism is accordingly interrupted. The space discharge devices may be considered as an electric valve arrangement controlling the flow of current to the electric motor or electrode feeding mechanism, and thus affording a very sensitive control of the electrical characteristic which is to be regulated, such as the voltage drop across the welding zone, and hence of the distance between the fusible end of the electrode and the work.

In order to insure that both space discharge devices will become conductive when the control voltage exceeds a predetermined value, a feature of the present invention is the impression of the controlling grid voltage on the grid or control circuit of only one of the space discharge devices. The output circuit of this space discharge device is then so related to the grid or control circuit of the other space discharge device that, when the first space discharge device becomes conductive, a potential above the critical will be impressed, during the next ½ cycle of the voltage wave, upon the grid of the second space discharge device which thereupon becomes conductive not more than ½ cycle before or after the first space discharge device becomes conductive. The two space discharge devices thus act in unison to provide full wave rectified current for the electrically operative device, or in the case of welding, for the electrode feeding mechanism. It will thus be seen that one space discharge device is operative in response to energization of the other space discharge device, whereby it is assured that both space discharge devices will operate to supply full wave rectified current to the feeding mechanism when the welding voltage exceeds a predetermined value.

In the drawing, the principles of the invention have been illustrated as applied to the automatic electric welding system described and claimed in U. S. Patent No. 2,260,510, issued October 28, 1941, in the name of Edwin A. Clapp. In order to simplify the drawing however, the means described and claimed in the patent for rectifying an alternating current welding voltage and impressing the resultant unidirectional potential upon the grid of the space discharge devices has been omitted from the drawing, although the connections for associating this feature of the Clapp system with the system of the present invention have been illustrated.

The welding circuit includes an electrode E, work W, and conductors 10 and 12 connected respectively to the electrode E and the work W. The other ends of conductors 10 and 12 may be connected, through a suitable switch, to a source of either direct or alternating electric current, both of which, for the sake of simplification, have been omitted from the drawing. A current limiting impedance 14, which may be a resistance if the welding current is direct current or an inductive reactance if the welding current is alternating current, may be included in the conductor 10.

The electrode feeding mechanism comprises a motor M driving rollers R which engage electrode E to vary its position relative to work W. Electrical energy for the electrode feeding mechanism and its associated control system is supplied from a suitable source of alternating current energy, not shown, through conductors 16 and 18 connected to the fixed terminals 20 and 22 of an autotransformer 24. A conductor 26 connects terminal 20 to one end of the primary winding 28 of a transformer 30, and a conductor 32 connects the other end of primary winding 28 to an adjustable tap 33 on autotransformer 24. A pair of conductors 34 and 36 connect the primary winding 38 of a transformer 40 to conductors 16 and 18, respectively. Transformer 40 is provided with a plurality of secondary windings 42, 44, and 46, for a purpose to be described hereinafter.

A substantially constant unidirectional potential is impressed on the shunt field winding F of the motor M through the medium of a full wave rectifying device 50. The anodes 52 of device 50 are connected by conductors 54 and 56 to opposite terminals of the secondary winding 44 of transformer 40, and the filament or cathode 58 is connected by conductors 60 and 62 to opposite terminals of the secondary winding 46 of the transformer 40. The mid-point 64 of secondary winding 44 and the mid-point 66 of secondary winding 46 are connected by conductors 68 and 70, respectively, to opposite terminals of the field winding F.

The armature A of the motor M is energized with unidirectional current through the medium of a pair of grid-controlled space discharge devices 72 and 74. Each of these devices comprises an anode 76, a control grid 78, and a cathode 80 indirectly heated by a filament 82 which is supplied with current through conductors 84 and 86 connected to opposite terminals of the secondary winding 42 of transformer 40. The discharge devices 72 and 74 are of the "thyratron" tube type, such as the FG-33, which permit the flow of current when the relative positive potential of the grid with respect to the cathode exceeds a certain critical value. When this relative positive potential of the grid is less than the critical value, the devices interrupt the flow of current through the circuit which they control. The grid-anode characteristic of these tubes is approximately vertical so that the grid-ignition potential is practically constant for all anode voltages within the voltage range of the tube. This characteristic increases the sensitivity of response and simplifies the circuit design.

The terminals 88 and 90 of secondary winding 91 of transformer 30 are each connected by an input circuit including conductors 92 and 94, respectively, to the anode 76 of one of the space discharge devices 72 and 74. A conductor 96 connects the mid-point 98 of the secondary winding 91 to an input terminal of a reversing switch S, and a conductor 100 connects the other input terminal of the reversing switch S to cathodes 80 of the devices 72 and 74. Conductors 102 and 104 connect the output terminals of reversing switch S to opposite sides of the armature A of the motor M. The reversing switch S may be used to adjust the position of the fusing end of the electrode E with respect to the work W preliminary to beginning a welding operation, and may also be used to retract electrode E from the work W when the welding operation has been completed.

The control circuit includes a pair of conductors 106 and 108 connected at one end to the conductors 10 and 12, respectively, of the welding circuit, and at the other end to the center pair of terminals of a double-pole, double-throw switch 109. Switch 109 constitutes manually operable means for selectively conditioning the control system for operation with either direct current or alternating current applied to the welding circuit, as fully described and shown in the Clapp patent mentioned above. Through the medium of switch 109, a unidirectional potential is impressed on the control circuit of device 72 irrespective of whether the welding circuit is supplied with direct current or with alternating current. When the welding current is direct current, switch 109 is closed to the left, as viewed in the drawing, to connect conductors 106 and 108 to a pair of terminals 110. When the welding current is alternating current switch 109 is thrown to the right, connecting conductors 106 and 108 to a pair of terminals 112. As described in the above Clapp patent, the terminals 112 are connected to a rectifying circuit for rectifying the alternating current potential of the welding circuit so that a unidirectional potential will be impressed on the control circuit. As such circuit forms no part of the present invention, it has been omitted from the drawing in order to simplify the latter.

Terminals 110 are connected to the fixed terminals 114 and 116 of voltage adjusting means, such as a potentiometer 118. A conductor 120 connects the relatively negative fixed terminal 116 to the conductor 100, which in turn is connected to the cathodes 80 of the space discharge devices 72 and 74. A relatively positive adjustable tap 122 of the potentiometer is connected by a conductor 124, through a voltage limiting resistance 126, to the grid 78 of the space discharge device 72. By suitable adjustment of the tap 122, a potential proportionate to the voltage drop across the welding zone may be impressed across the grid 78 and cathode 80 of the space discharge device 72 when the welding circuit is energized.

In accordance with the principles of the present invention, a proportionate part of the welding voltage is impressed on the grid 78 of the space discharge device 72 only, and not on the grid of the space discharge device 74. The potential applied to the grid 78 of the space discharge device 74 is derived from the output circuit of the space discharge device 72, in a manner to be described.

The control potential is applied to the grid 78 of the device 74 in the following manner. The output potential of the space discharge device 72 is impressed on the low impedance primary winding 130 of a current transformer 132, which primary winding is connected in series with cathode 80 of device 72. Since the current in this winding varies from zero to a maximum to zero during each half cycle, an alternating current voltage will be generated across the high voltage secondary winding 134 of the transformer 132. This voltage is applied, through resistance 136, to the grid 78 of the space discharge device 74. A condenser 138 is connected in parallel with the secondary winding 134 so that the positive phase of the potential generated by the transformer 132 will be maintained on the grid 78 of the space discharge device 74 until the start of the positive half cycle across the anode 76 and cathode 80 of the device 74. When the space discharge device 72 is conductive, the voltage impressed on the grid 78 of the space discharge device 74 through the current transformer 132 is above the critical voltage and therefore the device 74 will become conductive.

The circuit for impressing the output voltage of the space discharge device 72 on the primary winding 130 of the current transformer 132 is as follows: Cathode 80 of device 72, conductor 140, winding 130, conductor 142, conductor 100, switch S, conductor 104, armature A of motor M, conductor 102, switch S, conductor 96, mid-point 98 to terminal 88 through winding 91 of transformer 30, conductor 92, and anode 76 of device 72.

Rectified unidirectional current is supplied to the circuit of motor armature A as follows: Through the conductors 16 and 18, an alternating potential is impressed on autotransformer 24, and through adjustment of tap 33, a preselected proportion of this potential is impressed on the primary winding 28 of transformer 30. During that portion of the alternating current cycle in which, by virtue of conditions existing in the supply circuit, the terminal 88 of the secondary winding 91 of transformer 30 is positive with respect to the mid-point 98 and with respect to terminal 90, voltage will be applied from terminal 88 through conductor 82 to anode 76 of the device 72. If, at this time, the relative positive potential of control grid 78 is such that it will permit the device 72 to become active, current will flow from the anode 76 to the cathode 80 and through an output circuit including conductor 140, winding 130 and conductors 142, 100, and 104 to one armature terminal of the motor M. From the opposite armature terminal of the motor M, the current will flow through the remainder of the output circuit including conductors 102 and 96 to the mid-point 98 of the secondary winding 91, and through the winding 91 to the terminal 88. At the same time, as the terminal 90 is negative with respect to the terminal 88 and the mid-point 98, no potential will be applied to the device 74.

At the same time however, a varying potential is applied to the winding 130 of the current transformer 132, generating a high potential on the secondary winding 134 of this transformer. The current due to the generation of this potential is stored in the condenser 138. During the next half of the cycle, terminal 90 will be relatively positive with respect to mid-point 98 and terminal 88 of the secondary winding 91 of the transformer 30. During this half cycle voltage will be applied from terminal 90 through conductor 94 to the anode 76 of the device 74. At the same time, the condenser 138 will discharge, applying a potential above the critical to the grid 78 of the device 74, whereby current will flow through the device 74 from the anode 76 to the cathode 80, and thence through an output circuit including the conductors 100 and 104 to one side of the armature A of the motor M. From the other side of the armature A the current will flow through the remainder of the output circuit including conductors 102 and 96 to the mid-point 98 of the secondary winding of the transformer 30 and through this secondary winding back to the terminal 90. It will thus be observed that full wave rectified current is supplied to the motor armature A. At the same time, the circuit including field winding F is supplied with current from the full wave rectifying device 50, the operation of which will be readily understood upon inspection.

As the potential applied to the grid 78 of the device 74 is derived from the output circuit of the space discharge device 72, the device 74 will become conductive not more than ½ cycle later than the device 72, irrespective of variations in the constants of the device 74 with respect to those of the device 72, or variations in the respective ambient temperatures of the two devices. Therefore, extremely sensitive control of the energization of the motor armature A is obtained, as it is assured that the devices 72 and 74 will become conductive not more than ½ cycle before or after each other. It will be noted that the conductivity of the space discharge device 72 is controlled by the voltage impressed on the potentiometer 118, and device 72 in turn controls the conductivity of the device 74 so that there is no possibility that either of the devices will become conductive more than ½ cycle before or after the other one.

The operation of the welding system will now be described in detail. Before beginning the welding operation, motor M is energized to advance electrode E into operative relation with the work W, and with the fusing end of the electrode positioned at the preselected distance from the work W. Tap 33 of autotransformer 24 is then so adjusted that, when the motor is energized, it will operate rapidly enough to advance the electrode toward the work at a rate slightly in excess of the rate of consumption of the electrode.

If the current flowing in the welding circuit is direct current, switch 109 is closed to the left, whereby the welding potential is impressed directly on potentiometer 118 through conductors 106 and 108, switch 109 and terminal 110. If alternating current is flowing in the welding circuit, switch 109 is closed to the right, whereby a unidirectional potential is impressed on potentiometer 118 through the circuit described and shown in the above mentioned Clapp patent. In either event, the connections are so arranged that the fixed terminal 114 of the potentiometer is relatively positive and fixed terminal 116 relatively negative.

The adjustable tap 122 of the potentiometer 118 is then adjusted so that, when the spacing between the electrode E and the work W exceeds by a slight amount the desired spacing, a sufficient portion of the welding voltage will be impressed between the tap 122 and the terminal 116 that the relative positive potential of the grid 78 of the space discharge device 72 with respect to the cathode 80 thereof will exceed the critical value. Under such conditions, the device 72 will become conductive permitting current to flow in the motor armature winding circuit and will in turn apply a potential above the critical to the grid 78 of the device 74. The motor M will then move the electrode E toward the work W until such time as the predetermined spacing between the electrode and the work has been re-established. When this occurs, the welding voltage will have dropped to a value wherein the potential existing between tap 122 and terminal 116 will be less than the critical relative positive potential of the grid 78 of device 72 with respect to the cathode 80 thereof, thereby interrupting the flow of current through the motor circuit.

When the device 72 is conductive, a potential is impressed from the output circuit of the device upon the winding 130 of the transformer 132, and as this potential is varying in value, a high alternating current potential is generated in the winding 134 of transformer 132. The current due to this potential is stored in the capacitance or condenser 138 until such time as the terminal 90 of transformer 30 is relatively positive with respect to mid-point 98 and terminal 88 thereof, whereupon this potential will be impressed on the grid 78 of device 74 so that current will be supplied to the motor armature A during the succeeding half cycle.

From the foregoing, it will be apparent that an improved and simplified electrical control system has been provided in which the sensitivity of control has been increased by insuring that the space discharge devices will become conductive not more than ½ cycle before or after each other. It will be apparent that this is accomplished by impressing the control potential upon the control or grid circuit of only one of the space discharge devices and impressing a potential upon the control or grid circuit of the other space discharge device from the output circuit of the first discharge device. The control system is effective in many applications, particularly in applications in which the speed of an electrical mechanism, such as a motor, is to be regulated in accordance with predetermined conditions. More broadly, the control system is applicable to control output circuits of a pair of space discharge devices in accordance with predetermined values of an electrical characteristic of a controlled circuit, the value of which characteristic is controlled by electrically operable means supplied with current from said output circuits. The control system is particularly applicable to automatic electric welding operations wherein the end of a fusible electrode is to be maintained in predetermined relation to the work to be welded. In such latter applications, a characteristic of the welding zone, such as the voltage or current, is used to control the potential applied to the grid of the first space discharge device, which device, in turn, controls the potential applied to the grid of the second space discharge device, thereby insuring that both devices will become conductive not more than ½ cycle before or after one another.

While a specific embodiment of the invention has been illustrated, it is to be understood that this embodiment is exemplary only, and that the invention may be otherwise embodied.

What is claimed is:

1. A motor speed-control system comprising, in combination, a motor having a field circuit and an armature circuit; means for applying a substantially constant uni-directional potential to said field circuit; a pair of space discharge devices each having a control circuit and an output circuit, each control circuit including a control grid and a cathode, and each output circuit including an anode, said cathode, and said armature circuit; means, responsive to the operation of said motor, for applying a variable control voltage to the control circuit of one device; and means, connected to the output circuit of said one device, for applying a potential to the control circuit of the other device.

2. The combination claimed in claim 1, in which said means for applying a variable control voltage to the control circuit of said one device comprises an adjustable impedance; means connecting the cathode of said one device to a point of relatively negative potential on said adjustable impedance; and means connecting the grid of said one device to an adjustable point of relatively positive potential on said impedance.

3. The combination claimed in claim 1, in which the means connecting the control circuit of said other device to the output circuit of said one device comprises a transformer having a primary winding connected in series with the output circuit of said one device and a secondary winding connected in the control circuit of said other device; and a capacitance connected in parallel with said secondary winding.

4. An electric welding system comprising, in combination, a welding circuit including a fusible electrode and the work to be welded; electrically operable feeding means for advancing said electrode toward the work; a pair of grid-controlled space discharge devices controlling the energization of said electrically operable feeding means; means responsive to an electrical condition of said welding circuit for initially rendering only one of said devices operative to energize said electrically operable feeding means; and means responsive exclusively to the operative condition of said one device for rendering the other device operative to energize said electrically operable feeding means.

5. An electric welding system comprising, in combination, a welding circuit including a fusible electrode and the work to be welded; electrically operable feeding means for advancing said electrode toward the work; a pair of grid-controlled space discharge devices controlling the energization of said electrically operable feeding means; means responsive to an electrical condition of said welding circuit for controlling the energization of only one of said devices; and means responsive exclusively to an electrical condition of the output circuit of said one device for applying an energizing potential to the other device; whereby, upon energization of said one device, both devices will be operative conjointly to supply full wave rectified current to said electrically operable feeding means.

6. An electric welding system comprising, in combination, a welding circuit including a fusible electrode and the work to be welded; electrically operable feeding means for advancing said electrode toward the work; a pair of grid-controlled space discharge devices controlling the energization of said electrically operable feeding means; an adjustable potentiometer connected in parallel with said welding circuit; means connecting said potentiometer to the grid circuit of only one of said devices; and means connecting the output circuit of said one device to the grid circuit of the other device; the output circuits of both of said devices being connected to said electrically operable feeding means whereby, when a potential above the critical is applied to the grid circuit of one device, both devices will become operative conjointly to supply full wave rectified current to said electrically operable feeding means.

7. An electric welding system comprising, in combination, a welding circuit including a fusible electrode and the work to be welded; electrically operable feeding means for advancing said electrode toward the work; a pair of grid-controlled space discharge devices controlling the energization of said electrically operable feeding means; means connecting the output circuits of said devices to said electrically operable feeding means; means operatively associating the grid circuit of only one of said devices with said welding circuit; and means operatively associating the output circuit of said one device with the grid circuit of said second device; whereby, when a potential above the critical is applied to the grid circuit of said one device, both of said devices will become operative conjointly to supply full wave rectified current to said electrically operable feeding means.

8. An electric welding system comprising, in combination, a welding circuit including a fusible electrode and the work to be welded; an electric motor including an armature winding and a shunt field winding for advancing said electrode toward the work; a pair of grid-controlled space discharge devices connected in series with the armature winding of said motor; means for applying a unidirectional potential to the field winding of said motor; means for applying a proportionate part of the welding voltage to the grid circuit of only one of said devices; and means connecting the output circuit of said one device with the grid circuit of the other device; whereby, when the voltage applied to the grid circuit of said one device exceeds the critical grid voltage thereof, both of said devices will become operative conjointly to supply full wave rectified current to said armature winding.

9. An electric welding system comprising, in combination, a welding circuit including a fusible electrode and the work to be welded; electrically operable feeding means for advancing said welding electrode toward the work; a pair of grid-controlled space discharge devices controlling the energization of said electrically operable means; means connected in parallel with the welding circuit for applying a potential to the grid of only one of said devices; means, including a transformer connected to the output circuit of said one device for applying a potential to the grid of the other device; and a capacitance connected in parallel with the secondary winding of said transformer; whereby, when a potential above the critical is applied to the grid of said one device, both of said devices will become operative conjointly to supply full wave rectified current to said electrically operable means.

10. An electric welding system comprising, in combination, a welding circuit including a fusible electrode and the work to be welded; electrically operable feeding means for advancing said electrode toward the work; a pair of grid-controlled space discharge devices, each having an output circuit connected to supply current to said electrically operable feeding means, and a control circuit; means connecting the control circuit of only one of the devices to said welding circuit; a transformer having a primary winding connected in series with the output circuit of said one device and a secondary winding connected in the control circuit of the other device; and a capacitance connected in parallel with the secondary winding of said transformer; whereby, when a potential above the critical is applied to the control circuit of said one device, both of said devices will become operative conjointly to supply full wave rectified current to said electrically operable feeding means.

JOHN A. KRATZ.